Figure 1:
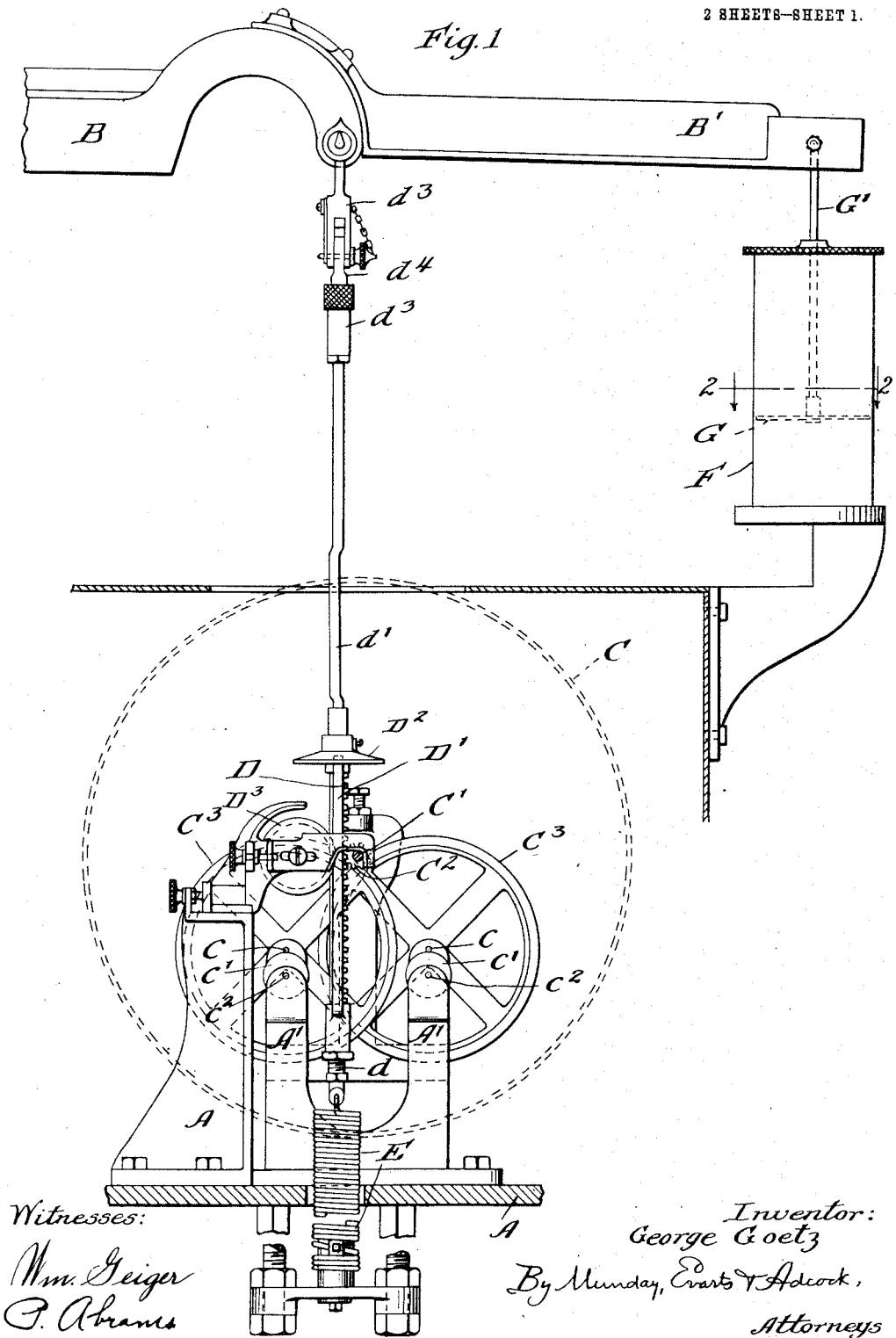

G. GOETZ.
RECORDING CAR SCALE.
APPLICATION FILED MAY 12, 1905.

979,401.

Patented Dec. 20, 1910.
2 SHEETS—SHEET 1.

Witnesses:
Wm. Geiger
G. Abrams

Inventor:
George Goetz
By Munday, Evarts & Adcock,
Attorneys

G. GOETZ.
RECORDING CAR SCALE.
APPLICATION FILED MAY 12, 1905.
979,401.
Patented Dec. 20, 1910.
2 SHEETS—SHEET 2.
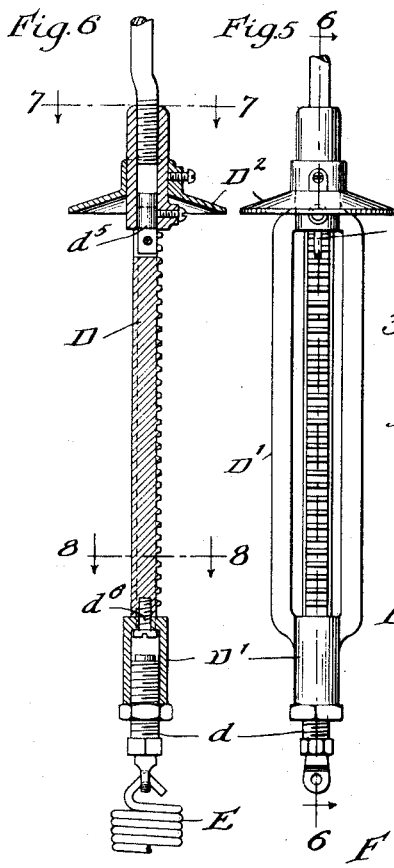
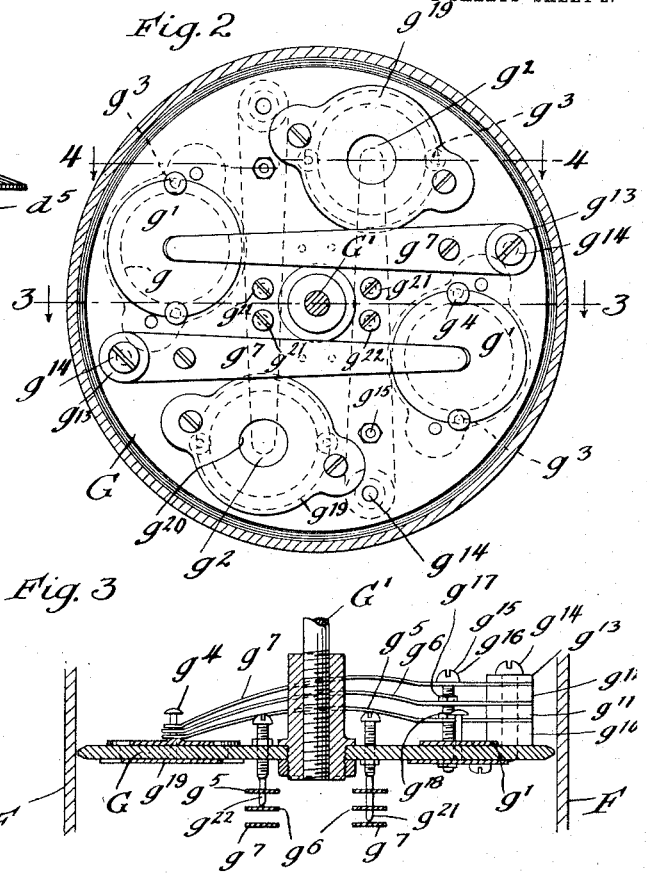
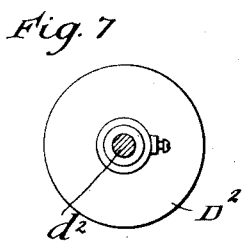
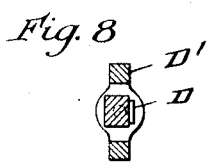
Witnesses:
Wm. Geiger
O. Abrams
Inventor
George Goetz
By Munday, Evarts & Adcock.
Attorneys

UNITED STATES PATENT OFFICE.

GEORGE GOETZ, OF CHICAGO, ILLINOIS, ASSIGNOR TO STREETER AMET WEIGHING & RECORDING COMPANY, OF CHICAGO, ILLINOIS, A CORPORATION OF ILLINOIS.

RECORDING CAR-SCALE.

979,401.                Specification of Letters Patent.      Patented Dec. 20, 1910.

Application filed May 12, 1905. Serial No. 260,117.

*To all whom it may concern:*

Be it known that I, GEORGE GOETZ, a citizen of the United States, residing in Chicago, in the county of Cook and State of Illinois, have invented a new and useful Improvement in Recording Car-Scales, of which the following is a specification.

My invention relates to improvements in scales for automatically weighing railway cars and recording or printing the weights thereof while the cars are in motion and passing over the scale platform in a moving train, and more particularly to improvements upon the recording car scale patented and shown and described in my Patents #651,845 of June 19th, 1900, and #778,359 of Dec. 27th, 1904, and having in combination with a scale beam and counterbalance spring and type wheel and type wheel shaft and gear, a movable rack meshing therewith and a dash-pot cylinder having a piston connected with the scale beam and furnished with upwardly and downwardly opening valves to regulate and steady the movement of the scale beam and type wheel.

The object of my present invention is to improve and perfect my recording scale, as shown and described in said prior patents, and more specially to increase its sensitiveness and accuracy and enable it to correctly weigh and record the weights of moving cars within units or limits of fifty pounds, whereas with my patented scales heretofore in use, it has not been considered practical to accurately weigh and record the weights of moving cars more closely than to units or limits of one hundred pounds.

My invention consists in the means I employ to practically accomplish this object or result. That is to say, it consists in connection with a scale beam, counterbalance weight, type wheel, type wheel shaft, gear and rack, of a dash-pot cylinder having a piston furnished with a plurality of upwardly and downwardly opening valves, each provided with a plurality of independently adjustable springs for holding the valves closed so that on a sharp and strong impulse being imparted to the dash pot piston from the scale beam, the valves in the piston may quickly and widely open to permit a comparatively free movement of the piston in the dash-pot cylinder and at the same time the valves gradually close as the velocity of the piston grows less and less and the scale beam nears the balance, and so that the scale beam as it nears a balance may be free to move and be but very slightly restrained in its movement by the dash-pot cylinder and piston, thus enabling the scale beam and the type wheel connected thereto to very quickly reach a true balance, while at the same time the sensitiveness of the scale is not interfered with, whereby moving cars may be weighed and the weights thereof recorded with accuracy and certainty and within narrow limits of variation.

My invention also consists in the novel construction of parts and devices and in the novel combinations of parts and devices herein shown and described.

In the accompanying drawing forming a part of this specification, Figure 1 is a side elevation, partly in vertical section of a recording car scale, such, for example, as that shown in my prior patents hereinbefore referred to and showing the adjacent and cooperative parts thereof relating to my present improvement. Fig. 2 is a horizontal section on line 2—2 of Fig. 1. Fig. 3 is a vertical section on line 3—3 of Fig. 2. Fig. 4 is a vertical section on line 4—4 of Fig. 2. Fig. 5 is a detail front view of the rack. Fig. 6 is a section on line 6—6 of Fig. 5. Fig. 7 is a section on line 7—7 of Fig. 6 and Fig. 8 is a section on line 8—8 of Fig. 6.

A represents a portion of the frame of the machine, B the scale beam of a recording car scale, such, for example, as that shown and described in my Patent No. 778,359, C the type wheel, $C^1$ the type wheel shaft, $C^2$ the gear thereon, D the rack and E the counterbalance spring.

F is the dash-pot, G the dash-pot piston and $G^1$ the stem of the piston connecting it with the extension arm $B^1$ of the scale beam B. The type wheel shaft $C^1$ is journaled on anti-friction wheels $C^3$ having shafts $c$ journaled on anti-friction wheels $c^1$, the shaft $c^2$ of which is journaled in the frame standards or brackets $A^1$.

The rack D which meshes with the gear $C^2$ on the type wheel shaft is secured in a rack holder $D^1$, preferably of aluminum, and having an adjustable screw threaded connection $d$ at its lower end to connect it with the counterbalance spring E and which is connected at its upper end with the scale beam by the connecting rods $d^1$ and clevis $d^2$ and adjustment connections $d^3$ $d^4$. The rack D which is preferably of steel, is fixed in its aluminum holder $D^1$ by means of connecting plug $d^5$ and connecting screw $d^6$. By this construction, the rack D may be made of steel or heavy metal, while its holder $D^1$ which gives the requisite stiffness and rigidity to the rack may be made of aluminum or other light metal, thus materially diminishing the inertia of the moving parts actuated by the scale beam, while at the same time giving the rack the requisite strength and stiffness to prevent vibration thereof, and thus materially increasing the delicacy and accuracy of the weighing and type recording apparatus. A hood $D^2$ is secured to the rack holder $D^1$ above the rack to prevent dust, dirt or small cinders getting into the gear and interfering with the operation. A guide roller $D^3$ mounted on the frame brackets keeps the rack in proper engagement with its gear wheel, while not interfering with its free reciprocating up and down movement.

The piston G of the dash-pot F is provided with a plurality of ports or openings $g$ through the same, preferably four in number, which are normally closed by two upwardly opening valves $g^1$ $g^1$ and two downwardly opening valves $g^2$ $g^2$, each of said valves preferably consisting of a light thin disk of metal having notches $g^3$ therein to engage the guide pins $g^4$ secured to the piston G. Each of the valves $g^1$ $g^1$, $g^2$ $g^2$ is normally held closed by three thin, light, flexible and independently adjustable flat springs $g^5$ $g^6$ $g^7$, with which each of the valves is provided. The set of springs $g^5$ $g^6$ $g^7$ for each valve is secured to the piston G by means of suitable washers or blocks $g^{10}$ $g^{11}$ $g^{12}$ $g^{13}$ and screw $g^{14}$, a washer being interposed between each spring. And each of the springs $g^5$ $g^6$ $g^7$ for each valve is independently adjustable, this being effected by the adjusting screw $g^{15}$ having a head $g^{16}$ bearing against the upper spring $g^7$, a nut $g^{17}$ bearing against the middle spring and a nut $g^{18}$ bearing against the lower spring. By providing each of the upwardly and downwardly opening valves in the dash-pot cylinder piston with a plurality of independently adjustable springs for holding it closed, the movement of the piston in the dash-pot cylinder may be made very sensitive to very slight movements, while at the same time producing a regulating and steadying effect upon the scale beam connected thereto, and is also caused to offer no undue obstruction to the quick movement of the scale beam under strong or violent impulses until the scale beam nears its balance position in weighing the passing car.

A cap plate $g^{19}$ having an opening $g^{20}$ therein is secured over each of the ports or openings $g$ in the piston G. The outer spring $g^7$ of each set of springs $g^5$ $g^6$ $g^7$ is furnished with an adjustable stop $g^{21}$ consisting in a screw mounted on the piston G to limit the movement of the spring toward the piston. The middle spring $g^6$ of each set of springs $g^5$ $g^6$ $g^7$ is furnished with a similar adjustable stop $g^{22}$.

I claim:—

1. In a weight recording car scale, the combination with the scale beam, counterbalance spring, type wheel, type wheel shaft and gear, of a movable rack holder connected at one end to the counterbalance spring and at its other end to the scale beam, and a separate piece rack mounted on said holder and meshing with said gear on the type wheel shaft, substantially as specified.

2. In a recording car scale, the combination with the scale beam, counterbalance spring, type wheel, type wheel shaft and gear, of a rack holder connecting the scale beam and counterbalance spring, and a rack mounted on said rack holder, substantially as specified.

3. The combination with a scale beam, of a counterbalance spring and type wheel, type wheel shaft and gear, an aluminum rack holder connecting said counterbalance spring, a scale beam and a rack mounted on said rack holder and meshing with said gear on said type wheel shaft, substantially as specified.

GEORGE GOETZ.

Witnesses:
 H. M. MUNDAY,
 P. ABRAMS.